United States Patent [19]
Flotow

[11] Patent Number: 5,186,573
[45] Date of Patent: Feb. 16, 1993

[54] COUPLING FOR CONNECTING SHAFTS

[75] Inventor: Richard A. Flotow, Butler, Ind.

[73] Assignee: Dana Corporation, Toledo, Ohio

[21] Appl. No.: 763,701

[22] Filed: Sep. 23, 1991

[51] Int. Cl.$^5$ .............................................. F16D 1/10
[52] U.S. Cl. .................................. 403/300; 403/304; 403/359; 464/169; 464/901
[58] Field of Search ................ 403/300, 304, 359, 11, 403/26, 325, 327; 464/169, 901, 164, 147, 150, 162, 149, 155, 156; 285/279, 375

[56] References Cited

U.S. PATENT DOCUMENTS

| | | |
|---|---|---|
| 920,841 | 5/1909 | Duryea et al. |
| 957,602 | 5/1910 | Duryea et al. |
| 994,141 | 6/1911 | Fletcher . |
| 1,009,702 | 11/1911 | Utz . |
| 1,171,341 | 2/1916 | Huff . |
| 1,305,029 | 5/1919 | Tibbetts . |
| 2,259,933 | 10/1941 | Holloway . |
| 2,325,184 | 7/1943 | Jampoler ................ 464/162 X |
| 2,579,191 | 12/1951 | Kludt . |
| 2,647,596 | 8/1953 | Cook . |
| 2,885,232 | 5/1959 | Eberly ................... 403/359 X |
| 3,069,875 | 12/1962 | Crum, Jr. ............... 464/169 |
| 4,357,137 | 11/1982 | Brown ................... 464/150 X |
| 4,991,992 | 2/1991 | Gutfleisch .............. 464/162 X |

Primary Examiner—Randolph A. Reese
Assistant Examiner—Chris Novosad
Attorney, Agent, or Firm—Millen, White, Zelano and Branigan

[57] ABSTRACT

A first shaft which is, for example, the output shaft of a clutch, is coupled to a second shaft which, for example, is the input shaft of a transmission, by a splined coupling. The splined coupling includes a first sleeve having internal splines for splining with the first shaft and external splines for splining with the internal splines of a second sleeve which internal splines also spline with the external splines of the second shaft. A first spring extending between the first sleeve and first shaft biases the first sleeve toward the second shaft, while a second spring extending between the first sleeve and second sleeve biases the second sleeve toward the second shaft. In order to decouple the first shaft from the second shaft so that, for example, a clutch may be removed from a drive train without removing a transmission, the first and second sleeves are pushed to a retracted position, collapsing the first and second springs. The sleeves are then held in the retracted position by a screw which extends through the sleeves and is tightened against the first shaft. Upon replacing or repairing the clutch, the clutch is reinstalled and a retaining screw released in order to reproject the sleeves and effect positive engagement between the output shaft of the clutch and input shaft of the transmission.

13 Claims, 2 Drawing Sheets

COUPLING FOR CONNECTING SHAFTS

BACKGROUND OF THE INVENTION

1. Field of the Invention

This invention relates to a coupling for connecting shafts. More particularly, this invention is directed to a coupling for connecting the output shaft of a clutch to the input shaft of a transmission.

2. Background

In drive trains for vehicles which include a transmission and clutch, clutches may require relatively frequent replacement or repair. This requires removing the clutch from the drive train. In many drive trains, it is necessary to remove the transmission before removing the clutch. Having to remove the transmission as well as the clutch involves additional time, labor and expense.

The problem has been addressed in the prior art. The prior art includes the concept of providing splines on both the output shaft of the clutch and the input shaft of the transmission and then coupling the clutch to the transmission with a coupling splined to both shafts. These prior art arrangements require considerable understanding and manipulation by the person removing the clutch and therefore may result in improper installation upon reconnecting the clutch to the transmission.

SUMMARY OF THE INVENTION

In view of the aforementioned considerations, and other considerations, the instant invention contemplates a coupling for connecting a first splined shaft to a second splined shaft with a retractable sleeve assembly. The retractable sleeve assembly includes a first sleeve splined on the first shaft and a second sleeve splined on the first sleeve. A first spring extends between the first shaft and the first sleeve to urge the first sleeve toward the second shaft, while a second spring extends between the first sleeve and the second sleeve to urge the second sleeve toward the second shaft; the second sleeve having splines thereon which mesh with the splines of the second shaft.

An advantage of the aforedescribed coupling is that it is useful for coupling the output shaft of a clutch to the input shaft of a transmission in a drive train so that the clutch may be decoupled from the transmission for replacement or repair and easily recoupled to the transmission when reinstalled without removal of the transmission.

BRIEF DESCRIPTION OF THE DRAWINGS

Various other objects, features and attendant advantages of the present invention will be more fully appreciated as the same becomes better understood when considered in conjunction with the accompanying drawing, in which like reference characters designate the same or similar parts throughout the several views, and wherein.

DETAILED DESCRIPTION

Figure 1:
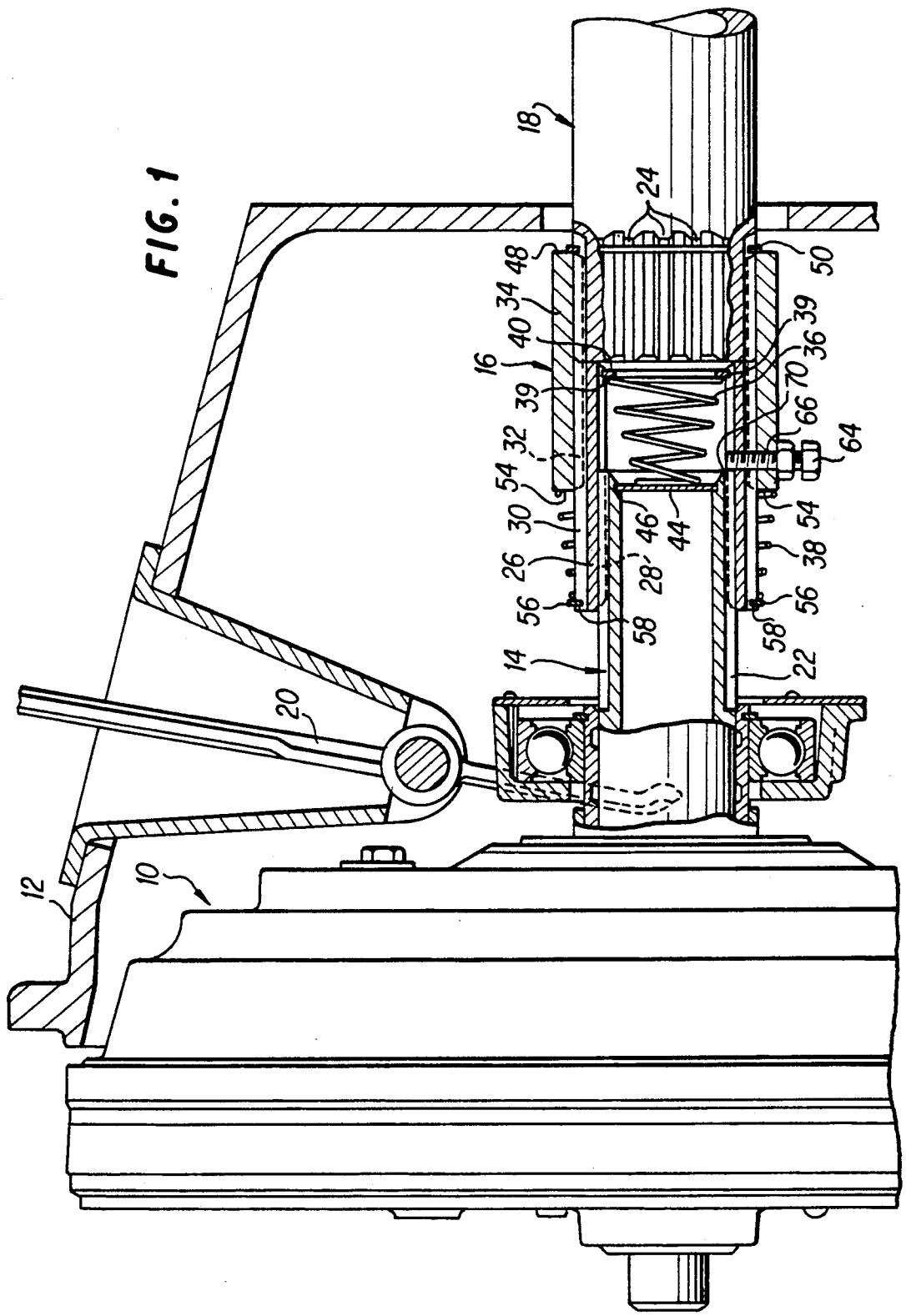
FIG. 1 is a elevation view, partially in section, of the coupling of the instant invention coupling the output shaft of a clutch to the input shaft of a transmission.

Referring now to FIG. 1, there is shown a clutch 10, mounted within a housing 12 and having an output shaft 14, coupled by a coupling 16 to the input shaft 18, of a transmission (not shown). The clutch 10 is a pull-clutch operated by a fork 20 in a conventional manner.

The output shaft 14 of the clutch 10 has splines 22 thereon while the input shaft 18 of the transmission (not shown) has splines 24. The input shaft 18 has a diameter greater than the output shaft 14, which as will be explained hereinafter, allows the coupling 16 to achieve a splined connection with both the output and input shafts.

Preferably, the output shaft 14 and the input shaft 18 are hollow or tubular to both save weight and reduce inertia. Since the coupling 16 is hollow or tubular, the coupling adds little weight or inertia to the drive train.

The coupling 16 includes a first splined sleeve 26 which has internal splines 28 thereon which mesh with the external splines 22 of the output shaft 14 of clutch 10. The first splined sleeve 26 also has external splines 30 which mesh with internal splines 32 of a second splined sleeve 34. The internal splines 32 of the splined sleeve 34 also mesh with the external splines 24 of the input shaft 18 connected to the transmission (not shown). As is seen in FIGS. 1 and 2, when the splines 22 mesh with the splines 28 of the sleeve 26 and the splines 32 of the second sleeve 34 mesh with both the external splines 30 of the first sleeve and the external splines 24 of the input shaft 18, there is a positive coupling between the shaft 14 and the shaft 18 so that the shafts rotate together in both directions.

The coupling 16 is normally biased to maintain the rigid connection between output shaft 14 and input shaft 18. This is accomplished by a first conical coil spring 36 which biases the first splined sleeve 26 to the coupling mode and a second conical coil spring 38 which biases the second splined sleeve 34 to the coupling mode. The first conical coil spring 36 is mounted under compression between a first stop in the form of a ring 39 mounted in a groove 40 adjacent the free end 42 of the first sleeve. The other end of the conical coil spring 36 abuts a plate 44 secured in a notch 46 of the output shaft 14 so that the spring 36 is under compression to urge the first sleeve 26 to project from the output shaft 14.

The second sleeve 34 has a free end 48 which abuts a split ring 50 seated within grooves 52 formed in the splines 24 of the output shaft 18. The second sleeve 34 is urged into abutment with the split ring 50 by the second spring 38 which abuts the inboard end 54 of the second sleeve and a split ring 56 seated within grooves 58 cut in the external splines 30 of the first sleeve 26.

Figure 2:
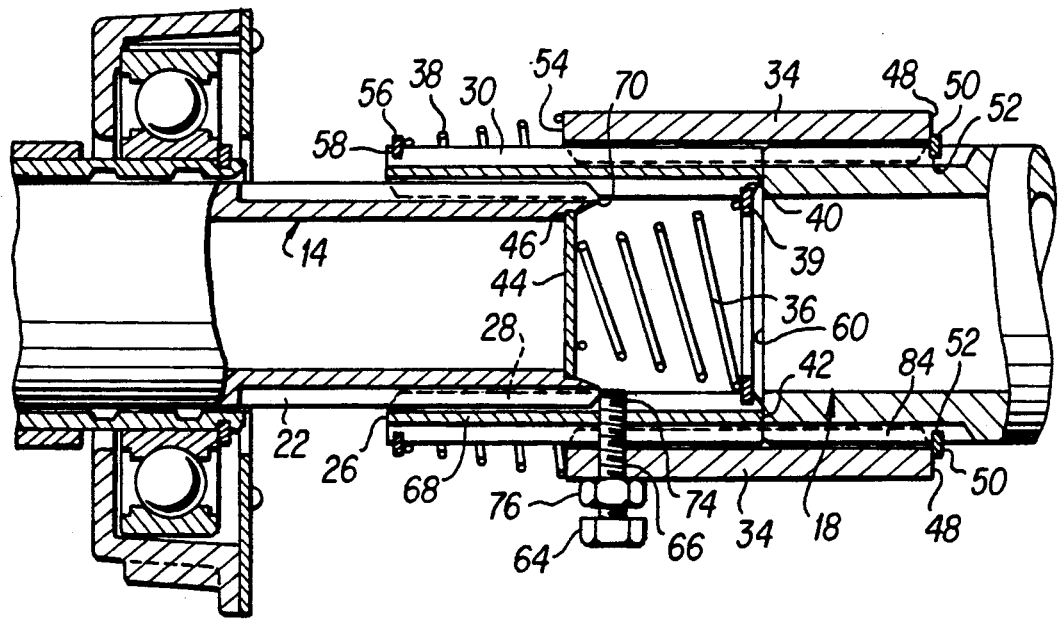
FIG. 2 is an enlarged elevation of the coupling of FIG. 1 when engaged.

As is seen in FIGS. 1 and 2, the first spring 36 biases the first sleeve 26 to slide with respect to the output shaft 14 until the free end 42 of the first sleeve abuts the free end 60 of the shaft 18 while the second conical coil spring 38 projects the second sleeve 34 until the free end 48 of the second sleeve abuts the ring 50. The various splines are long enough and the first and second springs 36 and 38 strong enough so that a positive connection is maintained by the coupling 16 between the shafts 14 and 18 regardless of any axial movement which may be induced in the connection as the shafts rotate. In addition, a locking screw 64 is threaded through a bore 66 in the second sleeve 34 and through a slot 68 in the first sleeve 26 to abut free end 70 of the output shaft 14. The locking screw 74 also serves as a fastener to secure the sleeves 26 and 34 in the retracted position of FIG. 3.

Figure 3:
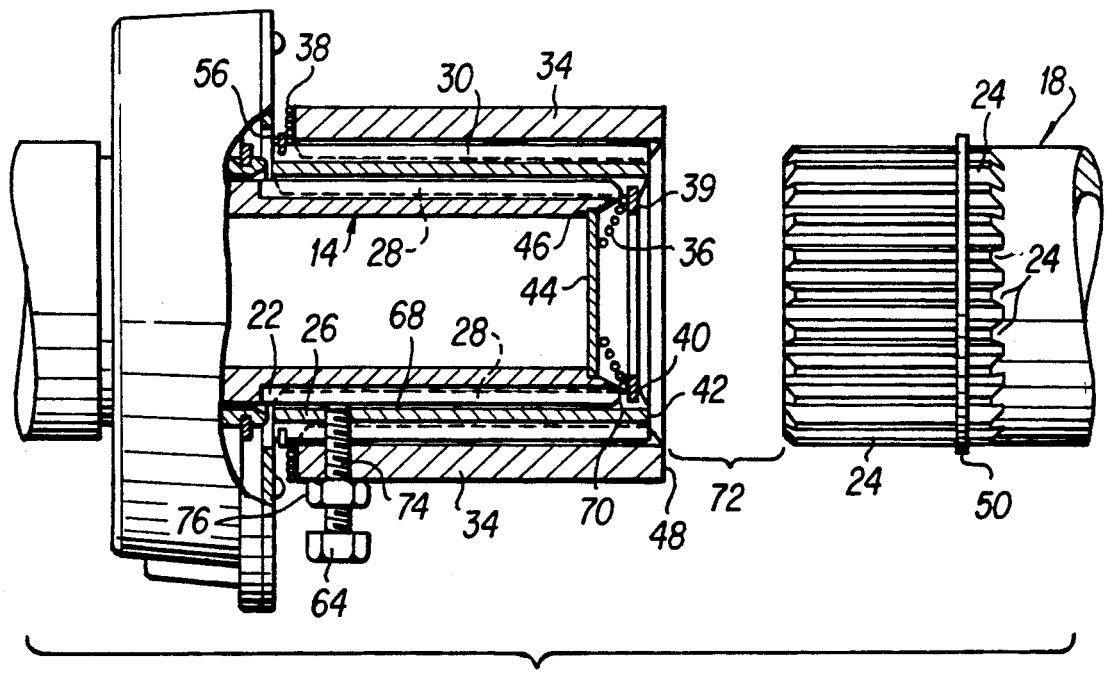
FIG. 3 is an enlarge elevation of the coupling of FIG. 1 when disengaged.

As is seen in FIG. 3, when it is desired to uncouple the output shaft 14 of the clutch 10 (FIG. 1) from the input shaft 18 of the transmission (not shown), the first sleeve 26 and second sleeve 34 are telescoped back over the output shaft against the bias of the first spring 36 and the second spring 38. Since the springs are conical and expand in diameter from a small diameter end to a large diameter end, the springs collapse with the coils nested, resulting in the springs consuming relatively little space in the axial direction. Consequently, a substantial gap 72 occurs between free end 48 of the second spline 34 and the free end 60 of the input shaft 18. The gap 72 allows one to drop and remove the clutch 10 without also having to drop or remove the transmission (not shown) driven by the input shaft 18.

The sleeves 34 and 26 are collapsed by first backing off the screw 64 to retract the shank 74 of the screw from axial proximity with the end 70 of the output shaft 14. In the illustrated embodiment, a retaining nut 76 which binds against the surface of the second sleeve 34 is first loosened. The second sleeve 34 is then pushed away from the shaft 18 to compress the spring 38. Upon the spring 38 being completely compressed against the stop ring 58 as is shown in FIG. 3, the first sleeve 26 must then also slide to the left from the position of FIGS. 1 and 2 to the position of FIG. 3. Thereafter, to retain the sleeves 26 and 34 in the retracted position of FIG. 3, the screw 64 is tightened against the outer surface of output shaft 14. In order to ensure that the first and second sleeves 26 and 34 do not fly off, or otherwise become detached from, the output shaft 14 if the screw 64 becomes loosened, the lock nut 76 is tightened.

After the clutch 10 has been repaired or a new clutch 10 is ready for installation, the output shaft 14 of the clutch is aligned with the input shaft 18 of the transmission as is shown in FIG. 3 and the screw 66 backed off allowing the first and second springs 36 and 38 to re-project the first and second sleeves 26 and 34. The first sleeve 26 then projects until the free end 42 thereof abuts the end 60 of the input shaft 18, while the second sleeve 34 projects until its free end 48 abuts the stop ring 52. It is, of course, necessary for the splines 32 of the second sleeve 34 to align with the spaces between the splines 24 on the shaft 18 in order for the second sleeve 34 to fully project. This is accomplished by releasing the output shaft 14 slightly with the pull-fork 20 so that the output shaft can be rotated slightly to correctly align the splines 32 on the second sleeve 34 with the spaces between the splines 24 on the shaft 18.

In the illustrated embodiment a specifically set forth in FIG. 1, the shafts 14 and 18 are characterized as the output shaft of a clutch 10 and the input shaft of a transmission; however, shaft 14 and 18 could be further characterized as first and second shafts useful in any arrangement in which the coupling 16 is used to detachably connect one shaft to another.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A coupling for connecting a first splined shaft to a second splined shaft comprising:
    a first sleeve having internal and external splines, the first sleeve being splined on the first shaft;
    a second sleeve having splines thereon and being splined on the first sleeve;
    a first spring extending between the first shaft and the first sleeve for biasing the first sleeve toward the second shaft;
    a second spring extending between the first sleeve and the second sleeve to urge the second sleeve toward the second shaft, whereby the splines of the second sleeve mesh with the splines of the second shaft to positively couple the first shaft to the second shaft.

2. The coupling of claim 1 further including a fastener for fastening the first and second sleeves in a retracted position.

3. The coupling of claim 2, wherein the first and second springs are conically configured coil springs under compression wherein, when the coupling is decoupled, the springs collapse axially with the coils thereof nested around one another.

4. The coupling of claim 3, wherein the first and second shafts have external splines, wherein the internal splines of the first sleeve mesh with the external splines of the first shaft and wherein the second coupling has internal splines which internal splines mesh with the external splines of the first sleeve and external splines of the second shaft.

5. An arrangement for coupling the output shaft of a clutch to the input shaft of a transmission wherein the output shaft and input shaft are both splined, the arrangement comprising:
    a coupling having first and second splined sleeves with the first splined sleeve being splined to the output shaft of the clutch and the second splined sleeve being splined on both the first splined sleeve and, when in a projected position, on the input shaft of the transmission; and
    at least one spring for biasing the second sleeve to the projected position wherein, to decouple the output shaft of the clutch from the input shaft of the transmission, the second sleeve is axially slid against the bias of the spring to decouple the second sleeve from the input shaft of the transmission whereby the clutch can be removed from the drive line without also removing the transmission.

6. The arrangement of claim 5 further including an additional spring disposed between the first sleeve and the output shaft of the clutch urging the first sleeve into abutment with the input shaft of the transmission and wherein the spring biasing the second sleeve to the projected position extends between the second sleeve and the first sleeve whereby pushing the second sleeve to a retracted position urges the first sleeve to the retracted position, disengaging the first sleeve from abutment with the input shaft of the transmission.

7. The arrangement of claim 6, wherein the springs are configured as conical coil springs in which the coils thereof nest within one another when the springs are collapsed.

8. The arrangement of claim 7, wherein the spring biasing the first sleeve is disposed within the first sleeve and the spring biasing the second sleeve is disposed exteriorly of the first sleeve.

9. The arrangement of claim 8, wherein a stop is provided on the input shaft of the transmission to engage the second sleeve when the second sleeve is in the projected position.

10. The arrangement of claim 6, wherein a fastener is provided to retain the first and second sleeves in the retracted position.

11. The arrangement of claim 10, wherein the fastener is a screw extending through the first and second sleeves for selective engagement with the output shaft of the clutch to retain the first and second sleeves in the retracted position.

12. The arrangement of claim 10, wherein the first and second sleeves are restrained axially with respect to the output shaft of the clutch only by the fastener when the first and second sleeves are in the retracted position and axially restrained when in the projected position only by engagement with the input shaft of the transmission, whereby the coupling may be assembled onto the output shaft of the clutch without obstruction.

13. The arrangement of claim 5, wherein the output shaft of the clutch and the input shaft of the transmission are both tubular to reduce weight and inertia.

* * * * *